United States Patent [19]
Roth

[11] 4,396,950
[45] Aug. 2, 1983

[54] CCD CAMERA

[75] Inventor: Roger R. Roth, Minnetonka, Minn.

[73] Assignee: Honeywell Inc., Minneapolis, Minn.

[21] Appl. No.: 371,847

[22] Filed: Feb. 26, 1982

[51] Int. Cl.³ .......................................... H04N 3/14
[52] U.S. Cl. ................................................. 358/213
[58] Field of Search ............... 358/213, 209, 293, 93, 358/109

[56] References Cited

U.S. PATENT DOCUMENTS 3,560,642  2/1971  Schroader et al. ............... 358/109

OTHER PUBLICATIONS

"Model CCD1300 Line-Scan Camera Subsystem", Fairchild Camera and Instrument Corp., 1977, Instruction Manual.
Fairchild CCD 133/143 Brochure dated Oct. 1979, Fairchild Camera and Instrument Corporation.

*Primary Examiner*—Richard Murray
*Attorney, Agent, or Firm*—Charles J. Ungemach

[57] ABSTRACT

A CCD camera capable of observing a moving object which has varying intensities of radiation eminating therefrom and which may move at varying speeds is shown wherein there is substantially no overlapping of successive images and wherein the exposure times and scan times may be varied independently of each other.

9 Claims, 7 Drawing Figures

CCD CAMERA

BACKGROUND OF THE INVENTION

The Government has rights in this invention pursuant to Contract No. DE-FC07-79CS-40242 awarded by the Department of Energy.

This invention relates to charge coupled device (CCD) type cameras and more particularly to a line scan camera subsystem useful in observing moving objects which may vary in intensity and speed.

CCD cameras have been known for some time, as for example, the model CCD 1300 line-scan camera subsystem manufactured by Fairchild Camera and Instrument Corporation. Such cameras may be used to observe and take line scans on moving objects or scenes where relative motion exists between the camera and the scene by exposing the CCD elements to the object or scene for a short period of time, transferring the charge build up on the CCD elements to a shift register and reading out the shift register while the next exposure of a different portion of the moving object or scene is made by the camera onto the CCD elements. A difficulty has been encountered with such a system in that with one exposure after another, a certain overlapping of the fields of view occurs which prevents good edge discrimination and it has not been possible to independently change both the exposure time (as is desired if the intensity of the object changes) and the scan time (as is desired if the speed of the object changes).

SUMMARY OF THE INVENTION

The present invention overcomes the problems of the prior art by providing an exposure time that is smaller than the scan time so that it can be varied independently of the scan time and then adjusting the scan time in accordance with the speed of the object so that successive scans being observed on the moving object occur substantially end to end thus eliminating overlap and considerable smear. Furthermore, by properly adjusting the scan and exposure times, increases and decreases in intensity can be accommodated since the exposure time can be changed and increases and decreases in the speed of the moving object can be accommodated since the scan time can be changed, it being independent of the exposure time.

DETAILED DESCRIPTION OF THE PREFERRED EMBODIMENT

Figure 1:
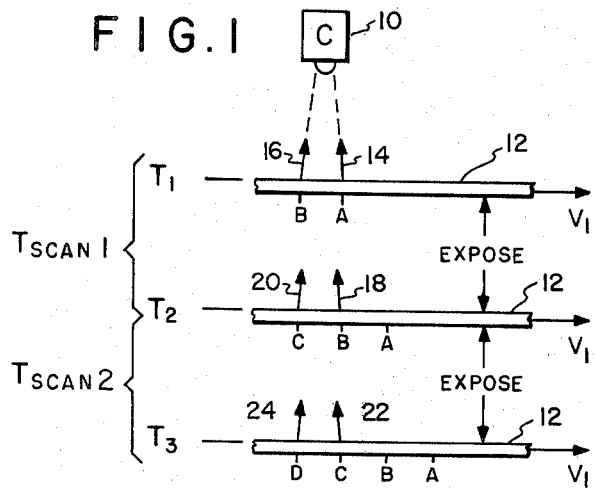
FIG. 1 shows the system of the prior art.

FIG. 1 shows a camera 10 which may be like the model CCD 1300 line-scan camera above described and a moving object 12 shown as a slab of material moving to the right of FIG. 1 at a velocity V1. Of course, object 12 may be stationary and camera 10 may be moving or both may move. Likewise, camera 10 may be moving to observe a number of different objects in a scene. Radiation, such as infrared radiation or visible light, is shown eminating from a portion of the object 12 along a direction shown by arrows 14 and 16 to the camera 10 where it is focussed onto an array of CCD detectors (not shown) which extend in one or more rows into the paper. Accordingly, at time $T_1$, camera 10 is viewing an area of object 12 which extends into the paper a distance that is dependent upon the size of the CCD array and the optics of the system and which has a line width defined by the area from A to B.

The CCD elements in the camera 10 begin integrating the radiation received from object 12 while object 12 moves to the right and after a period of time $T_2-T_1$, which is identified as "T scan 1", the charges built up on the CCD elements are transferred to a shift register for readout and a second exposure is started. During the first exposure, the object 12 moved a certain distance shown in FIG. 1 as the distance between A in the upper portion of the drawing and A in the middle portion of the drawing. Accordingly, at time $T_2$, camera 10 is receiving radiation from an area between points E and C along arrows 18 and 20, respectively. It should be noted that the area observed by camera 10 during the exposure time, $T_2-T_1$, is the area between points A and C in FIG. 1.

During the second scan, identified as "T scan 2", which takes place during a time $T_3-T_2$, the CCD elements in camera 10 receive radiation starting with the area between E and C to the final position at $T_3$ where it sees the area between C and D along arrows 22 and 24, respectively. At time $T_3$, the object 12 has moved an additional distance shown by the difference between point A in the middle portion of FIG. 1 and point A in the lower portion of FIG. 1. Accordingly, it can be seen that during the time T scan 2, the CCD elements receive radiation from the area defined by B and D. At time $T_3$, the charges built up on the CCD elements are again transferred to the shift register for readout and the next scan is begun.

It should be noted that the area between points B and C was observed twice by camera 10, first during T scan 1 and next during T scan 2. Thus an overlap has occurred which is undesirable. This continues through further scans with overlaps occurring in areas between points C and D etc. It will be observed that considerable smearing of the images occurs when the system of the prior art is used. It should also be noticed that should the speed of the object 12 change, then to observe the same area, the T scan time would have to be changed but this would change the exposure time. Likewise, if the intensity of radiation being received by camera 10 changed making it desirable to change the exposure time, the T scan time would have to be changed.

Figure 2:
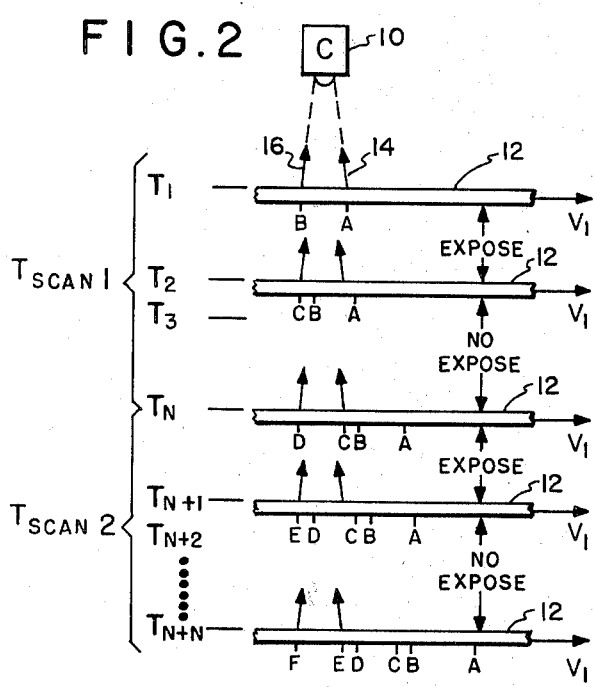
FIG. 2 shows the system of the present invention.

FIG. 2 shows the system of the present invention and how it solves the problems discussed in connection with FIG. 1 above.

In FIG. 2, the camera 10, which is like the camera 10 in FIG. 1, is shown receiving radiation from the object 12 which is moving to the right at a velocity $V_1$ starting from points A and B along arrows 14 and 16, just as was the case in FIG. 1. The CCD elements in camera 10 receive radiation starting from the area defined by points A and B until the time $T_2$ occurs. Time $T_2$ is chosen to be somewhat smaller than the T scan 1 time and accordingly, object 12 only moves the distance shown by the difference between point A in the upper portion of FIG. 2 and point A in the next lower portion of FIG. 2, which is considerably smaller than was the case in FIG. 1. At time $T_2$, the charges built up on the CCD elements in camera 10 are transferred to the shift register for readout and the next exposure is begun. As will be further explained, a difference occurs in that in FIG. 2, the exposures which were taken subsequent to time $T_2$, during T scan 1, are not used or are discarded as is shown by the expression NO EXPOSE in FIG. 2. Accordingly, it is seen in FIG. 2 that from time $T_2$ down past time $T_3$ to time $T_N$, which is the T scan 1 time, any further exposures of the CCD elements in camera 10 are discarded and are not utilized. At time $T_N$, which has been chosen so as to be substantially equal to the time necessary for point C to move to the point A occupied at the top of FIG. 2, the second exposure is begun. During the second exposure, the process described in connection with T scan 1 is repeated from time $T_N$ until $T_{N+N}$ at the end of T scan 2.

It should be noticed that the first exposure that is utilized (i.e.; a "valid exposure" during $T_2-T_1$) the camera is exposed to an area defined by points A and C in FIG. 2. By the time the second scan begins, point C has moved to the point A had previously occupied so that during the second valid exposure ($T_{N+1}-T_N$) an area defined by the distance between points C and E is observed. At time $T_{N+N}$, point E has moved to the position point A had originally occupied and accordingly the next subsequent scan will start with an area defined by point E and continue to the left. Thus it is seen that the present invention has eliminated the problem of overlapping images since in FIG. 2 the images will be seen as substantially edge to edge.

Figure 3:
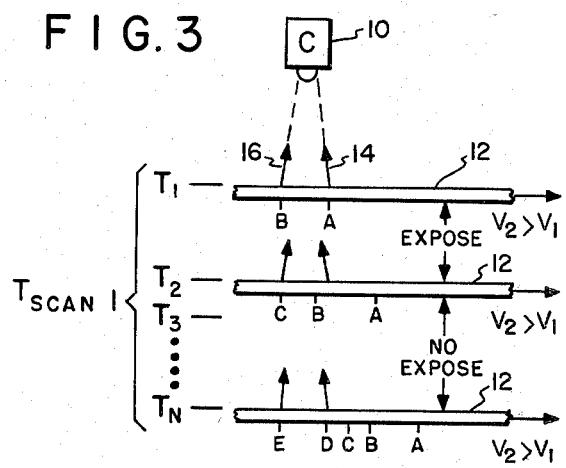
FIG. 3 shows a difficulty experienced when the velocity of the object changes.

FIG. 3 shows what would happen with respect to FIG. 2 if the speed of the object 12 with respect to the camera 10 changed and if no provisions were made for changing the T scan time. In FIG. 3, the camera 10 again observes radiation from object 12 along arrows 14 and 16 which defines an area surrounded by points A and B in FIG. 3. The speed of object 12 is shown to be $V_2$ which is greater than $V_1$ and accordingly at time $T_2$, point B has moved to a position further away from point C than was the case in connection with FIG. 2. During the time $T_1$ to $T_2$, the valid exposure of the CCD elements occurs and at time $T_2$, the charges thereon are transferred to the shift register for future use. During the remaining times $T_2$, $T_3$ . . . $T_N$ in FIG. 2, any exposure of the CCD detectors is not used, as shown by the expression "NO EXPOSE" in FIG. 3. It is seen that by the time object 12 has reached the position shown by $T_N$, point C has moved beyond where point A originally was and the next scan will start with the area defined by points D and E. Thus the area between points C and D will never have been observed by camera 10 and a problem occurs.

Figure 4:
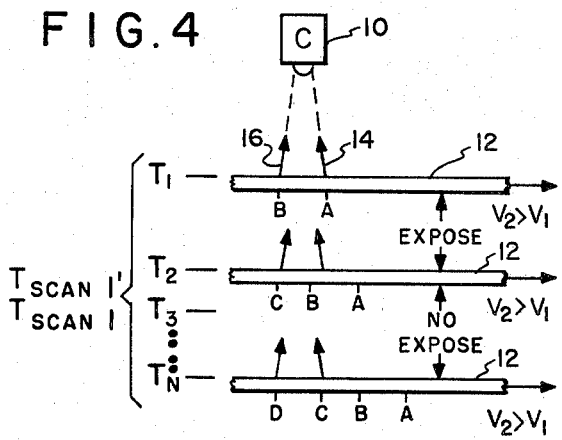
FIG. 4 shows how the present invention overcomes the problem of FIG. 3.

FIG. 4 shows the solution to the problem set out in connection with FIG. 3 in which the T scan time is changed from T scan 1 to T scan 1' with T scan 1' being smaller than T scan 1. It is seen in FIG. 4 that the object 12 is again producing radiation along arrows 14 and 16 to the camera 10 during a valid expose time which exists between times $T_1$ and $T_2$. In FIG. 4, $T_1$ and $T_2$ are the same as they were in FIGS. 2 and 3 so that the same amount of radiation is received by the CCD elements. However, the time between $T_2$ and $T_N$ has now been made smaller by an amount just sufficient to cause the point C seen at the middle portion of FIG. 2 to move to a position previously occupied by point A. Thus, on the next exposure, the radiation will be received from the area between points C and D and there will be no portion of the object which is not observed. Of course, if, instead of increasing, the speed of the object had decreased in FIG. 3, then, instead of there being a gap, which was not observed, there would have been an overlapping which was also undesirable. In that event, in FIG. 4, the T scan' time would be made greater than T scan 1 so as to again provide that point C in FIG. 4 would arrive at the point previously occupied by point A at the time the next scan was to begin. Accordingly, it is seen that by varying the scan time, one can accommodate changes in speed of the object being observed without changing the exposure time when the present invention is used.

Figure 5:
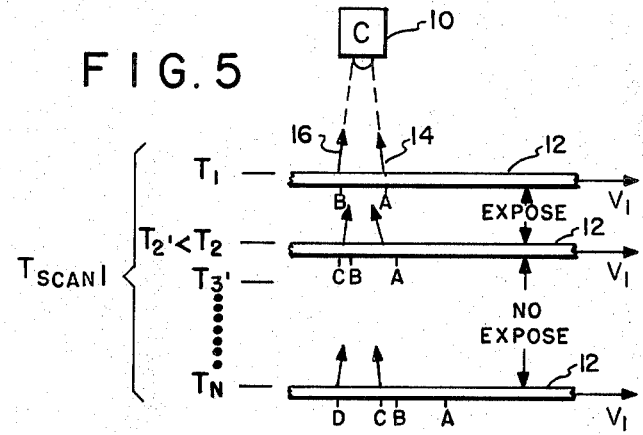
FIG. 5 shows how the system can accommodate changes in intensity.

FIG. 5 shows the situation which may occur when the intensity of radiation is increased even though the speed of the object has not been changed. In FIG. 5, the object 12 is again providing radiation along arrows 14 and 16 to camera 10 and an exposure is started at $T_1$. The speed of object 12 is the same as it was before, $V_1$, but is assumed that the intensity of radiation has increased, requiring the exposure time to be decreased. Accordingly, in FIG. 5, the valid exposure occurs between time $T_1$ and time $T_2$, wherein $T_2$, is less than $T_2$ by an amount sufficient to accumulate the same amount of radiation applied to the CCD elements in camera 10. Since the time $T_2$, is less than time $T_2$, the time between time $T_2$, and time $T_N$, representing the end of T scan 1, is now larger than it was before. This does not cause a problem, however, since this time is merely split into a greater number of interval times $T_3$, . . . $T_N$ so that again at time $T_N$, camera 10 is ready to receive radiation from points C through D where C is occupying the position previously occupied by A.

Because the CCD elements in camera 10 can be overexposed if the time between $T_2$ and $T_N$ is too large, provisions are made for periodically dumping the charge build up on the CCD elements during the time $T_2$ through $T_N$. This will be better seen in connection with FIG. 7. The system of the present invention has an additional advantage in that the time between times $T_2$ and $T_N$ may be more readily used for transferring the charges from the CCD elements to the shift register and reading them out which takes a finite amount of time than was the case in FIG. 1 where there was substantially no time between the end of one exposure and the beginning of the next. This will also be more readily seen in connection with FIG. 7.

Figure 6:
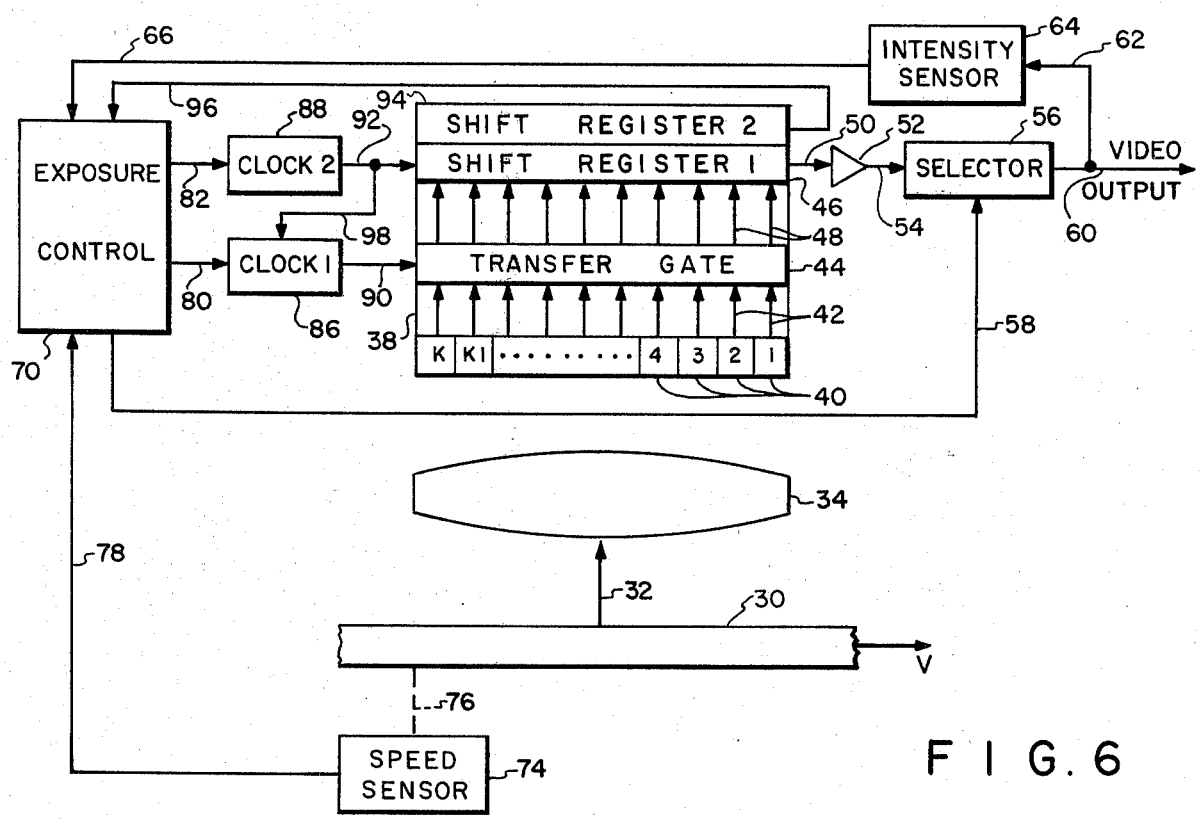
FIG. 6 shows a schematic representation of the circuitry of the present invention.

FIG. 6 shows an embodiment of the present invention in which the moving scene, shown by reference numeral 30 in FIG. 6, is travelling to the right at a velocity V. Again, of course, the scene may be stationary with the camera moving or both may move. Radiation from the scene 30 travels along a direction generally shown by arrow 32 to the optical system of the camera shown as a lens 34 which operates to direct the radiation towards the sensor circuit or chip 38 having at the lower portion thereof CCD elements 40 identified by numbers 1, 2, 3, 4 . . . K-1 and K. The number of CCD elements utilized in a given system is a matter of choice and the camera used in the present embodiment employed 2048 such elements. The charges on CCD elements 1-K are transferred periodically as shown by arrows 42 to a transfer gate 44 from whence they are transferred to a first shift register 46 by arrows such as shown at 48. After the transfer has occurred, shift register 46 produces a serial output at 50 to an amplifier 52 and from amplifier 52 along an output 54 to a selector 56. Selector 56 has an additional input 58 which indicates when a valid video signal exists and allows the selector to transfer the output on line 54 to a video output 60. The output 60 is not only a representation of the image of scene 30, but the size of the signals at output 60 is an indication of the intensity and accordingly a connection 62 is shown connected from the output 60 to an intensity sensor 64 which produces an output representative of the intensity of the signal on the video output at an output 66 which is presented to an exposure control 70. Of course, the intensity of radiation from scene 30 may be determined in other ways as, for example, by an intensity sensor observing the scene 30 directly.

Exposure control 70 may comprise a computer capable of operating on the various signals to control the scan times and the exposure times as shown in connection with FIGS. 4 and 5 above. The input shown on conductor 66 provides the information to the exposure control 70 indicative of the intensity of radiation being received and exposure control 70 will adjust the expose time between time $T_1$ and $T_2$ in FIG. 5 in accordance with that intensity.

The speed of object 30 is sensed by a speed sensor 74 shown connected thereto by dashed line connection 76 and produces an output 78 which provides an input to exposure control 70 indicative of the speed of the object 30. Speed sensor 74 may be a mechanical connection that actually measures the velocity of the object 30 or the lens 34 or may be another device such as another camera which derives the speed from observing the time between two consecutive positions of points on the object. Accordingly, line 78 provides the information to the exposure control 70 to enable it to adjust the T scan time in accordance with object-camera relative speed as was explained in connection with FIG. 4. The T scan time is calculated from the velocity of the object 30 by the equation T scan=d/v where v is the velocity of the object, and d is the distance A-C in FIG. 4.

The outputs of exposure control 70 are shown as outputs 80 and 82 respectively which in turn provide inputs to a first clock 86 and a second clock 88 respectively. The output of clock 86 is shown as output 90 presented to transfer gate 44 and the signal on output 90 operates to cause transfer gate 44 to periodically bring the charges from the CCD elements 40 to the shift register 46. This, in effect, controls the exposure time since the faster the clock pulses which exist on output 90 occur, the less time the CCD elements 40 have to integrate radiation received from object 30. More particularly, the sensed intensity on line 66 is given by the equation $S=KT_iI$ where S is the sensed intensity; K is a constant of proportionality which depends on the physical characteristics of the CCD sensors, the lens system and the selection of engineering units; $T_1$ is the exposure time and I is the intensity of radiation impinging on the CCD sensors and which is restricted to a finite range by practical considerations so that the equation $S=KT_iI$ remains in the linear region. To hold the sensed intensity constant, $T_i$ is adjusted to equal $S_o/KI$ where $S_o$ is the desired constant intensity which may be averaged over a number of successive scans. Accordingly, by knowing the intensity of the output on video output 60, which is presented to exposure control 70 on line 66, a calculation is made by the exposure control 70 to produce a signal on line 80 which will adjust the first clock 86 to transfer the signals from the CCD elements to the shift register more or less rapidly as desired.

The output on line 82 through clock 88 controls an output on line 92 which causes the shift register to begin transferring its information along line 50 to amplifier 52 to produce the output.

As will be explained further, shift register 1 can shift the signals out to amplifier 52 at various frequencies. Because the video output signal cannot exceed a frequency which the utilizing apparatus downstream can handle, a slow frequency $F_2$ is used when the selector 56 is set to transmit to output 60. At other times, when selector 86 dumps the output, a faster frequency $F_1$ may be used. The desired frequency information appears on line 92 from clock 88.

At the time the first shift register 46 begins to produce an output on line 50, the second shift register 94, which is set up to operate as a counter at the same frequency as shift register 46, begins producing signals on a line 96 which is presented as an additional input to exposure control 70. The second shift register 94 consists of a plurality of zeros except for the last shift which will be a 1 or vise versa and informs the exposure control 70 when the entire shifting process has been completed. As mentioned above, the shifting out of the valid video signal from the first shift register 46 to amplifier 50 occurs at a relatively low frequency $F_2$ to provide a more accurate and useable output for the downstream electronics. During the nonvalid times, charges are nevertheless being built up on CCD elements 40 and since the nonvalid time is considerably larger than the valid time, these charges could reach saturation. Accordingly, it is desired to transfer the charges from the CCD elements through the transfer gate to the shift register and out through the amplifier 52 to the selector 56 to be dumped periodically during the nonvalid times to prevent overcharging of the CCD elements. Clocks 1 and 2 operate to produce these transfers and since the downstream electronics need not use the signals being generated, the dumping can occur at a much higher frequency $F_1$ than was the case during the valid exposure time. A line 98 coming from clock 2 to an input of clock 1 coordinates the transfer gate and the shift register so that they will begin operating at the correct times with respect to one another for the various frequencies.

Figure 7:
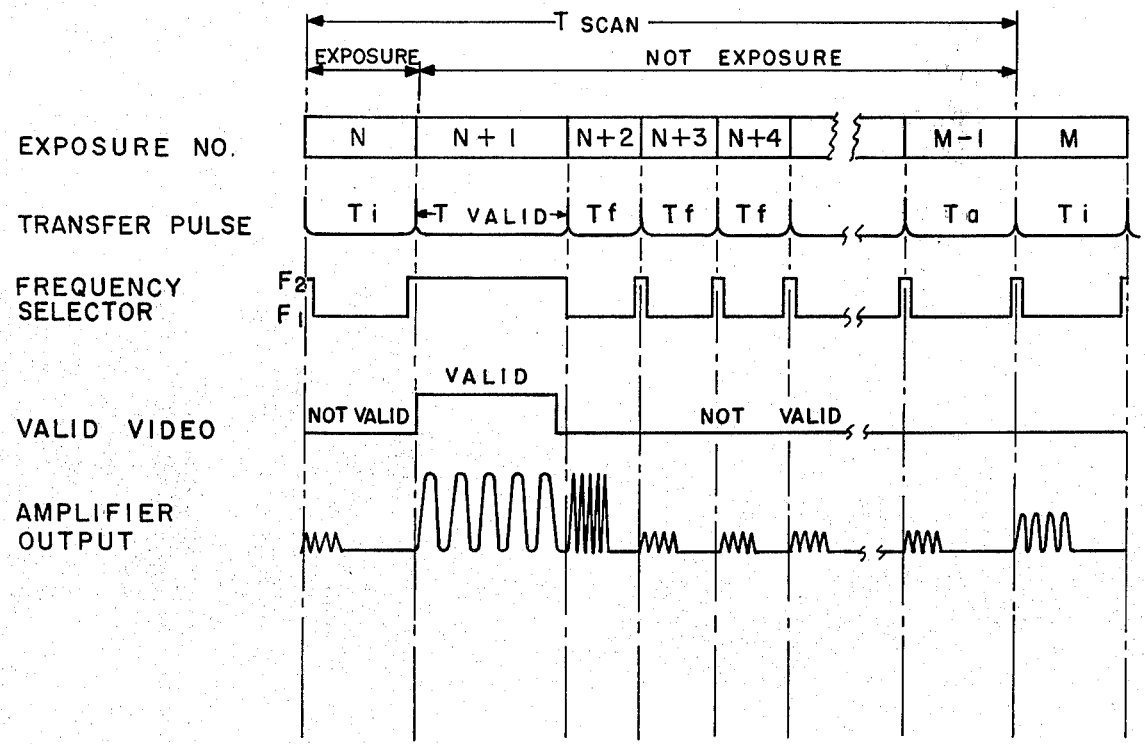
FIG. 7 shows a chart of the relative scan and exposure times in the operation of the present invention.

Reference to FIG. 7 shows the various timing functions involved in the circuit of FIG. 6. In FIG. 7, a plurality of exposures, identified as N, N+1, N+2, N+3, N+4, ... M−1 and M are shown at the top of the chart and are seen to have different lengths. The time between the beginning of exposure N and the end of exposure M−1 is the T scan time. During the exposure N, the CCD elements are exposed to the radiation and during the remaining time, the exposure of the CCD elements is not used as is shown by the "NOT EXPOSURE" section of FIG. 7.

During the time of exposure N, the CCD elements are receiving radiation from the moving object and integrating it. At the end of the exposure N, a transfer pulse is provided which causes the signals to be shifted into shift register 46 of FIG. 6. Thereafter, the CCD elements 40 may again be exposed to the radiation from object 30 although until the next exposure number M, such signals will not be utilized. During the time immediately following exposure N; i.e., during N+1, the signals stored in shift register 46 are fed out serially to amplifier 52, selector 56 and to provide a valid video output 60. The frequency selector pulse appearing on output 92 from clock 88 causes shift register 46 to produce its output either at a fast frequency $F_1$ or at a slow frequency $F_2$. This can be seen in the third line of FIG. 7 where $F_1$ is presented to shift register 46 during the time N, $F_2$ is supplied during the time N+1 and thereafter the fast frequency $F_1$ is supplied during the times N+2, N+3, N+4 ... M−1 and M. Although in FIG. 7 it is shown that the frequency changes to a slow value at a time proximate each of the transfer pulses, this was done in the preferred embodiment to assure that the charges on the CCD elements return to a more or less constant starting value so that each subsequent charge of the CCD elements began at the same point. It is possible that these additional pulses would not be necessary and the frequency $F_2$ would exist from the point at the end of exposure number N+1 all the way to just before the beginning of exposure M+1 (not shown). It is also seen in the third line of FIG. 7 that the slow frequency $F_2$ starts just prior to the valid output N+1 and this is to assure that the shift register 46 is running at the proper slow speed prior to the dumping of the signals in serial fashion therefrom to the amplifier 52. FIG. 7 also shows the signal from exposure control 70 along line 58 to selector 56 as the valid video signal. It is seen that during the exposure number N and the exposure numbers N+2 ... M, a not valid signal is presented to selector 56 so that the signals from the shift register 46 will not be transmitted to the video output during these times. However, during the exposure number N+1, the signal from the exposure control 70 along line 58 will allow the selector 56 to produce the video output on line 60 as a valid output. The valid video signal is shown terminating slightly before the end of exposure number N+1 for purposes of assuring that no signals from the N+2 exposure are received at the video output. Since there is plenty of time for the shift register 46 to produce its output during the time N+1, the ending of the valid video signal before the ending of N+1 does not provide any difficulties.

The last graph in FIG. 7 shows amplifier 52's output as a series of pulses of different frequencies. The output during exposure time N is at a fast frequency and has a slightly larger magnitude than some of the downstream outputs because it was accumulated during a time which may be slightly larger than other times. The valid output is shown to be at a slow frequency and fairly large since it was accumulated during a fairly large exposure time N. The output at exposure number N+2 is at a fast frequency but is fairly large since it was gathered during the fairly large time N+1. The remaining outputs in the exposure numbers N+3, N+4 ... M are a fast frequency and relatively small since the times for N+2, N+3, N+4 are relatively small. As a matter of fact, after the exposure control 70 has determined the intensity of the signal from the last reading, it will know how long the exposure number N must be and since the exposure N+1 is fixed by the requirements of the shift register 46 to produce a lower frequency output, the time from the end of exposure number N+1 until the beginning of the next exposure M is determined and may vary with the speed of the object 30. Knowing the time that is available between the end of N+1 and the beginning of M provides the exposure control with the ability to determine how many additional exposure numbers will be needed. Recalling that the CCD elements if left too long exposed to the radiation from object 30 may become saturated or overcharged, it is desirable to dump the charge build up on the CCD elements at a time before this happens. The time N+2, N+3, N+4, etc. may be chosen to be approximately half that amount of time since the final exposure number M−1 has to take up the slack between the last of the fill times ($T_f$) and since the time $M_1$ still must be sufficient to prevent overcharging the CCD elements, the time for M−1 ($T_a$) has to be almost as large as the time decided upon to utilize preventing the CCD elements from being overcharged.

Accordingly, the exposure controller will determine the number of exposures after the N+1 exposure in accordance with the speed of the object 30 and the intensity of the output 60.

It is thus seen that I have provided a line sensing CCD camera capable of observing a moving object without overlapping images of the object and in which the exposure time can be varied with intensity without there being a change in the scan time and that the scan time may be changed without there being a change in the exposure time and all without significant smearing of the image and with a useable output not obtainable in the prior art.

Many obvious changes and modifications will occur to those skilled in the art and I do not wish to be limited to the specific disclosures used in connection with the preferred embodiment. I intend only to be limited by the following claims.

The embodiments of the invention in which an exclusive property or right is claimed are defined as follows:

1. An observation system comprising:
   an array of detectors positioned to receive radiation from successive predetermined sized portions of a scene during a plurality of exposure periods, wherein there is relative motion between the array and the scene, the detectors producing signals of magnitude dependent upon the intensity of radiation from the scene and the length of each exposure period during which the detectors are exposed to the radiation;
   first sensing means responsive to the relative speed of the array and the scene, connected to the array to begin each exposure period at a time such that each successive portion of the scene to which the array is exposed substantially abuts the previous portion; and
   second sensing means responsive to the intensity of radiation from each successive portion of the scene, connected to the array to end each exposure period at a time such that the signals produced by the detectors are below a predetermined limit.

2. Apparatus according to claim 1 further including transfer means connected to the array and operable to transfer the signals from the detectors to output means.

3. Apparatus according to claim 2 wherein the transfer means includes a transfer gate and a shift register connected to the first and second sensing means to cause the transfer of signals to the output means after the exposure period.

4. Apparatus according to claim 3 wherein subsequent to each exposure period a no exposure period occurs during which period any signals generated by the detectors are discarded so as not to reach the output means, the duration of the no exposure period varying with the relative speed of the scene and array and with the exposure period.

5. Apparatus according to claim 4 wherein the first and second sensing means includes first signal generating means connected to the transfer gate to cause a first transfer of signals to the shift register after the exposure period and to cause a second transfer of signals to the shift register at the end of the no exposure period.

6. Apparatus according to claim 5 including second signal generating means connected to the shift register to cause the transfer of signals from the shift register to the output means.

7. Apparatus according to claim 6 including selector means connected between the shift register and the output means and connected to the first and second sensing means and operable to cause any signals produced by the detectors during the no exposure period to be directed, by the selector, from the shift register away from the output means and to cause any signals generated by the detectors during an exposure period to be directed, by the selector, to the output means.

8. In a system for observing a radiation emitting scene with a camera having an array of CCD elements each of which operate to produce a charge of magnitude dependent upon the exposure time and intensity of radiation received thereby, the camera and scene having relative motion and the array transferring the charges on the CCD elements periodically to output means so that the output means receives signals indicative of the radiation from successive portions of the scene, the improvement comprising:

radiation transmitting means operable between a time $T_a$ and a time $T_b$ to expose the array to radiation from a first portion of the scene;

timing means operable subsequent to time $T_b$ to transfer the charge on the CCD array to output means;

adjusting means responsive to the relative speed of the camera and the scene connected to the radiation transmitting means and operable between a time $T_c$ and a time $T_d$ to expose the array to radiation from a second portion of the scene, the period between $T_b$ and $T_c$ being adjusted in accordance with the relative speed so that the first and second portions of the scene are substantially adjacent; and sensing means responsive to the intensity of radiation from the scene and connected to the radiation transmitting means to adjust the period between time $T_a$ and time $T_b$ and the period between time $T_c$ and time $T_d$ in accordance with changes in the intensity of radiation from the scene so as to maintain the charge transferred to the output means proximate the predetermined average level.

9. A camera useable to produce an output indicative of a scene that produces radiation which varies in intensity, the scene and the camera having relative motion which varies in speed comprising:

a CCD array;

optical means for directing radiation from the scene to the CCD array;

a first clock;

a second clock;

a first shift register;

a transfer gate connected to the array, to the first clock and to the first shift register to transfer signals from the array to the first shift register upon receipt of a clock signal from the first clock, the shift register producing an output signal indicative of the transferred signals from the array upon receipt of a clock signal from the second clock;

selector means connected to receive the output from the first shift register and operable upon receipt of an input signal to transfer the output from the first shift register to a resultant output and to discard the output from the first shift register in the absence of an input signal;

computer means;

speed sensing means connected to the computer means to supply a signal thereto indicative of the relative speed of the camera and the scene; and intensity sensing means connected to the computer means to supply a signal thereto indicative of the intensity of radiation from the scene, the computer means having a first output connected to the first clock to vary the times of transfer of signals from the array to the first shift register in accordance with the signals from the speed sensing means and the intensity sensing means, the computer means having a second output connected to the selector means to supply the input signal to the selector means in accordance with the signals from the speed and intensity sensing means.

* * * * *

UNITED STATES PATENT AND TRADEMARK OFFICE
CERTIFICATE OF CORRECTION

PATENT NO. : 4,396,950

DATED : August 2, 1983

INVENTOR(S) : Roger R. Roth

It is certified that error appears in the above-identified patent and that said Letters Patent is hereby corrected as shown below:

On the title page, In filing date, "Feb. 26, 1982" should read -- April 26, 1982 --.

Signed and Sealed this

Seventeenth Day of January 1984

[SEAL]

Attest:

GERALD J. MOSSINGHOFF

Attesting Officer     Commissioner of Patents and Trademarks